United States Patent [19]
Harmel, Jr.

[11] 3,831,903
[45] Aug. 27, 1974

[54] ATMOSPHERICALLY ISOLATED MIXING APPARATUS WITH VISCOSITY RESPONSIVE INDICATOR

[76] Inventor: Richard P. Harmel, Jr., 126 Babcock St., Brookline, Mass. 02146

[22] Filed: Aug. 3, 1972

[21] Appl. No.: 277,678

[52] U.S. Cl.... 259/1 R, 259/DIG. 30, 259/DIG. 46, 259/99
[51] Int. Cl............................................ B01f 13/08
[58] Field of Search........... 259/DIG. 46, 1, 99, 102

[56] References Cited
UNITED STATES PATENTS
3,220,802  11/1965  Hartley....................... 259/DIG. 46
3,734,119  5/1973   Nudds......................... 259/DIG. 46

*Primary Examiner*—Robert W. Jenkins
*Attorney, Agent, or Firm*—John E. Toupal

[57] ABSTRACT

Disclosed is a mixing apparatus for mixing liquids in a mixing chamber that is isolated from the atmosphere. A water bath is provided for temperature regulation and a viscosity responsive indicator monitors the condition of the liquids in the chamber.

15 Claims, 5 Drawing Figures

ATMOSPHERICALLY ISOLATED MIXING APPARATUS WITH VISCOSITY RESPONSIVE INDICATOR

BACKGROUND OF THE INVENTION

This invention relates to mixing apparatus and, more particularly, to apparatus for mixing liquids while monitoring the viscosity thereof and with the liquid isolated from the atmosphere and at a regulated temperature.

Initial experiments by a manual technique demonstrated that measurement of the oxygen inhibition of free radical initiated polymerization of vinyl compounds could successfully be utilized as a new method for oximetry of blood and other fluids. The method is described in detail below by way of example. This process should be carried out with the reagents isolated from any gaseous phase. In addition, optimum results are not obtained by carrying on the process in a vacuum chamber because evaporation therein can change the proportions of the reagents and some of the oxygen that is sought to be measured will be drawn out of the reagent by the vacuum. Thus, a mixing apparatus in which the process could be performed in the absence of a gas phase but without a vacuum was sought. Such a chamber, in order to provide maximum accuracy in the oximetry process, would additionally provide for temperature regulation of the reagents. Also, inasmuch as a viscosity change in the reagent mixture determines the end point of the process, the mixing apparatus should include a viscosity responsive indicator. No suitable mixing chamber apparatus was found.

The object of this invention, therefore, is to supply a mixing apparatus that isolates the reagents therein from any gaseous phase and also provides temperature stabilization and viscosity monitoring.

SUMMARY OF THE INVENTION

This invention is characterized by a mixing apparatus that includes a stationary mixing chamber with an access port which is covered by an atmospheric isolation cover so that reagents can be added to the mixing chamber without permitting an interface between the reagents and the atmosphere. Also provided is a monitor apparatus that is responsive to the viscosity of the reagent mixture and a stirrer for mixing the reagents in the chamber. Facilities are provided for a temperature regulating water bath. Thus chemical processes can be carried on in the mixing apparatus at a constant temperature while isolated from the atmosphere and in conjunction with a monitor that is responsive to the viscosity of the reagent mixture.

A feature of the invention is an expansible mixing chamber. The mixing chamber is defined by a plurality of walls, one of which is movable to permit adjustments in the volume of the chamber. For example, in the preferred embodiment disclosed herein the mixing chamber is defined by a syringe, and the movable wall comprises the plunger. The opening of the syringe is covered by a rubber injection port to isolate the mixing chamber from the atmosphere. Thus when reagents are injected through the rubber injection port with a hypodermic needle the plunger is displaced by the entering reagent thereby expanding the capacity of the mixing chamber while isolating the reagent from the atmosphere. The resiliency of the rubber injection port causes it to seal the small puncture made by the hypodermic needle when the needle is withdrawn.

Another feature of the invention is the inclusion of a magnetic stirrer bar within the mixing chamber. This is advantageous inasmuch as agitation within the chamber is provided by an external magnetic stirring motor without the necessity of a direct connection within the mixing chamber. In addition, the monitoring apparatus, which includes a coil surrounding the mixing chamber within the magnetic field created by the magnetic stirring bar, does not require a direct connection within the chamber. As the stirring bar moves within the mixing chamber an electromotive force is generated within the coil. As the viscosity of the reagents within the mixing chamber increases the stirring bar moves more slowly and thus the generated electromotive force declines in amplitude. Consequently, a measurement of the generated electromotive force is indicative of the viscosity of the reagents within the mixing chamber.

DESCRIPTION OF THE DRAWINGS

These and other features and objects of the present invention will become more apparent upon a perusal of the following description taken in conjunction with the accompanying drawings wherein.

DESCRIPTION OF THE PREFERRED EMBODIMENT

Figure 1:
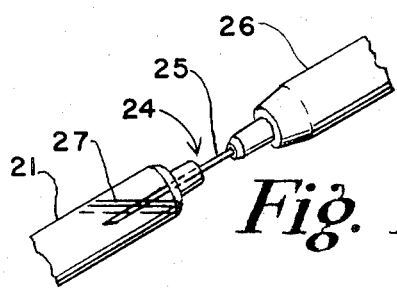
FIG. 1 shows a syringe being filled with reagent by a hypodermic needle in accordance with the exemplary method.

The rate at which many chemical reactions proceed is affected markedly by the presence or absence of oxygen. The copolymerization of two vinyl monomers, specifically acrylamide and bisacrylamide, is discussed in detail by way of example only. Other uses for the mixing apparatus will be apparent.

Polymerization of acrylamide is initiated by sulfate radical ions ($SO_4 \cdot ^-$) generated by the scission of a weak O—O linkage in persulfate ions ($S_2O_8{-}$) with the activation energy advantage provided by a reduction activator, bisulfite ($HSO_3^-$). The sulfate radical ion attacks the double bond of an acrylamide molecule as follows to generate an acrylamide radical.

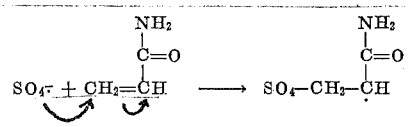

In the absence of oxygen, polymerization would then occur through propagation steps based on acrylamide radicals attacking fresh acrylamide molecules to yield new radicals which would then attack further fresh acrylamide molecules, and so forth in a chain reaction, with the polymer solution becoming progressively more viscous and ultimately gelling as polymerization proceeds.

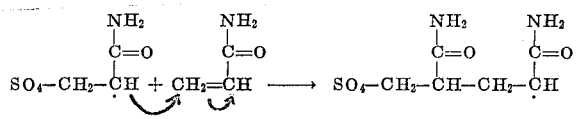

The firmness of the polymer thus formed is increased by adding a certain proportion of N,N'-methylenebisacrylamide, which permits cross-linking of polymer chains:

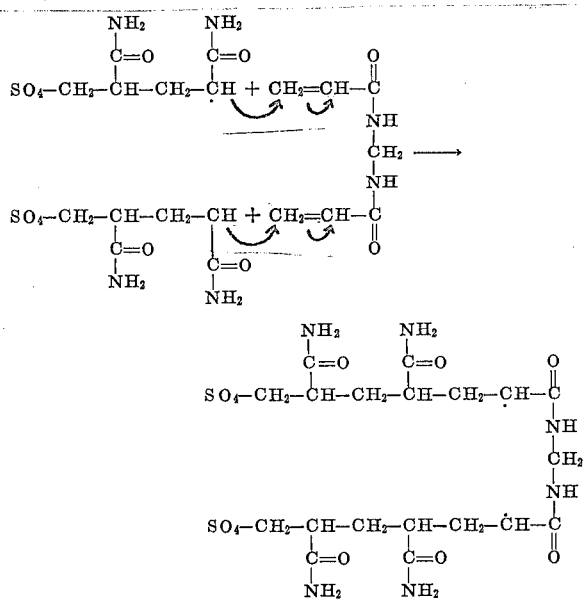

In the presence of oxygen, the acrylamide radical reacts with molecular oxygen in preference to another molecule of acrylamide to yield a peroxy radical.

This, in contradistinction to the acrylamide radical, is relatively unreactive. Thus the acrylamide, rather than lengthening its polymer chain, is tied up as long as oxygen is present. The oxygen is used up, of course, as it is incorporated into acrylamide molecules. Once its concentration in the medium because sufficiently small, the peroxy radicals and acrylamide radicals will again react with acrylamide, and the more reactive acrylamide-ended radicals will react quickly in chain-lengthening steps. (The peroxy radicals are, of course, slow to react. However, once a peroxy radical does react with an acrylamide molecule, it forms an acrylamide-ended radical and thus continues to react rapidly.) The net result of all this is a lag period during the course of the polymerization reaction, during which oxygen is used up, followed by rapid polymerization. The transition between these phases can be quite abrupt. The more oxygen present in relation to acrylamide, the longer the lag period.

Three solutions are generally used in the acrylamide oxygen assay in addition to the blood sample: a monomer solution, a persulfate solution and a bisulfite solution.

1. Monomer Solution: This is prepared according to the formula:

| Acrylamide | 6.12 g |
| Bisacrylamide | 0.308 g |
| Distilled Water | 20 ml | and degassed 8 min in 30 ml syringes with a rotary vacuum pump. If the liquid to be assayed varies in pH, it is beneficial to buffer the monomer solution by dissolving 0.477 g of HEPES (available from Calbiochem, Los Angeles), or other buffer, in a portion of the distilled water along with the acrylamide and bisacrylamide, titrating to pH 7.4, adding the remainder of the distilled water and degassing as described. The degassing step can be omitted if a new standard curve is prepared daily as described below. The acrylamide appears quite stable on storage. It should be kept stoppered, refrigerated and in the dark to slow any spontaneous polymerization. Before use the solution is rewarmed to room temperature (23°).

2. Bisulfite Solution: For banked heparinized (anticoagulated) blood, 0.123 g. sodium bisulfite is dissolved in 50 ml of degassed distilled water and transferred to evacuated glass tubes. For fresh heparinized blood, the amount of bisulfite is increased to 0.160 g. Degassing of the water can be omitted as described below. The solution is prepared fresh daily. These quantities were empirically determined to be optimum.

3. Persulfate Solution: 0.154 g of ammonium persulfate is dissolved in 50 ml distilled water and the solution is degassed. The degassing can be omitted if a new standard curve is prepared daily. The solution is prepared fresh daily.

Figure 2:
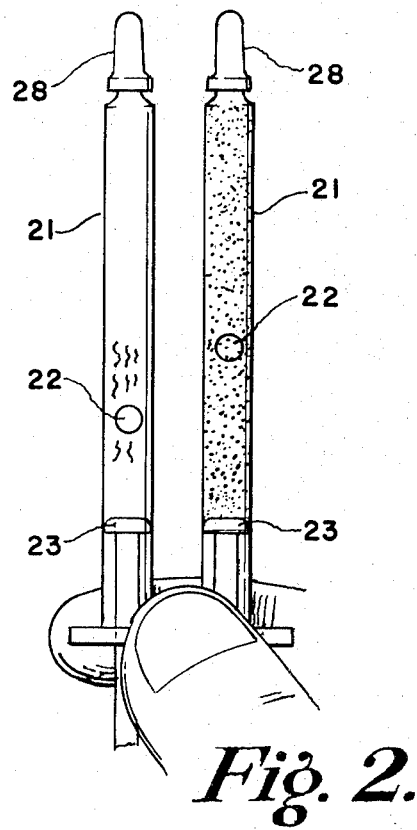
FIG. 2 shows two syringes filled with the reagents and each containing a glass bead wherein the reaction in the left syringe is incomplete but the reaction in the right syringe has reached the point of gelation and the glass bead therein has become immobilized.

Referring now to FIGS. 1 and 2, the acrylamide assay is run manually in a 1 ml plastic tuberculin syringe mixing chamber 21, calibrated in 0.01 ml divisions containing a glass bead 22 that is 4 mm in diameter and serves to mix reactants and to detect the formation of a polymer gel by monitoring viscosity. The plunger 23 is moved to the 0.40 ml mark and monomer solution is injected to the tip of the syringe orifice 24. The solution is injected from a hypodermic needle 25 on another syringe 26 as shown in FIG. 1. Note that once fluid is in the syringe 21 and a liquid-gas interface 27 appears, new fluids are inserted below that interface. The plunger 23 is then moved to the 0.60 ml mark and persulfate solution is injected, again to the tip of the syringe orifice 24. The plunger 23 is moved to the 0.70 ml mark and 0.10 ml blood sample with heparin is added, to the tip of the orifice. The present contents of the syringe comprise the test liquid. The syringe 21 is capped with a cap 28 and mixed by inversion 10-15 times. Hemoglobin is liberated from red cells by this procedure. The cap 28 is removed, the plunger lowered to below the 1.0 ml mark, and 0.30 ml of the bisulfite activator solution, premeasured in a 1 ml syringe, is rapidly injected to begin the reaction and production of the product. Timing with a stopwatch begins as this injection is concluded. The air bubble at the top is expressed, the syringe 21 capped and held as shown in FIG. 2 (the syringe 21 is held as shown in FIG. 2 to avoid warming the solution by body heat) and mixed by inversion while observing the glass bead 22. Timing stops when the glass bead 22 becomes immobilized (as shown in the right syringe) by an increase in viscosity showing the product has completed the formation of a polymer gel. This is preceded by a 10 second warning period of increasing viscosity.

A blank determination of a base reference time is performed identically with 0.10 ml normal saline (physiological saline solution) in place of blood. The polymerization time observed for the blank is subtracted from each experimental polymerization time.

The polymerization reaction is exothermic. With a thermal probe in the reaction syringe, the temperature is observed to rise 4°–5° within the 15 seconds preceding gelation; after gelation the temperature rises more rapidly to about 20° over the starting level. Thus, temperature could be used as an indication of the gelation.

Oxygenated blood, initially bright red in the reaction syringe 21, slowly darkens to a deep violet as the polymerization reaction proceeds. The bright red color can be restored to the gel subsequently by exposure to oxygen, suggesting that the initial color change is due to deoxygenation of the oxyhemoglobin. Thus, color is indicative of gelation.

Figure 3:
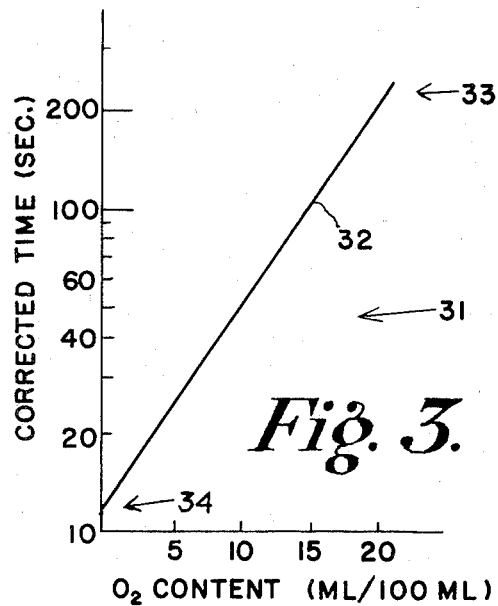
FIG. 3 is a graph of the log of reaction time vs. oxygen content that is a typical standard of comparison for the exemplary method.

Referring next to FIG. 3 there is a typical standard of comparison that is a graph 31 that is a curve 32 with an upper end point 33 and a lower end point 34. Comparison of results of oximetry by the subject method and by conventional techniques has shown a plot of the logarithm of time v. oxygen content is linear to 22 ml $O_2$/100 ml blood.

There was some day-to-day variation in the polymerization time - oxygen content curves obtained with nondegassed acrylamide making it desirable to find a rapid means to establish a daily standard curve. This was most readily accomplished by computing the oxygen content of a fully oxygenated blood sample from the hemoglobin content (1.34 ml $O_2$/ gm Hb) plus dissolved oxygen, and using this sample to establish the upper end 33 of the curve 32, while using a saline blank to establish the lower end 34 of the curve. The lower end 34 of the curve 32 does not go through the origin because saline is not a true blank. Only blood with no oxygen would be. This is no problem, however, inasmuch as the curve 32 is linear. Corrected polymerization time is sample polymerization time minus blank polymerization time.

Use of manual mixing and timing and hand-held syringes 21 for the oxygen assay, through it is simple and inexpensive, opens the method to a substantial amount of deviation and error. It was felt imperative to develop a semiautomatic system that would eliminate subjective estimation of the end point of the reaction and minimize the variability of mixing vigor and temperature, so more reproducible and accurate results could be obtained.

Figure 4:
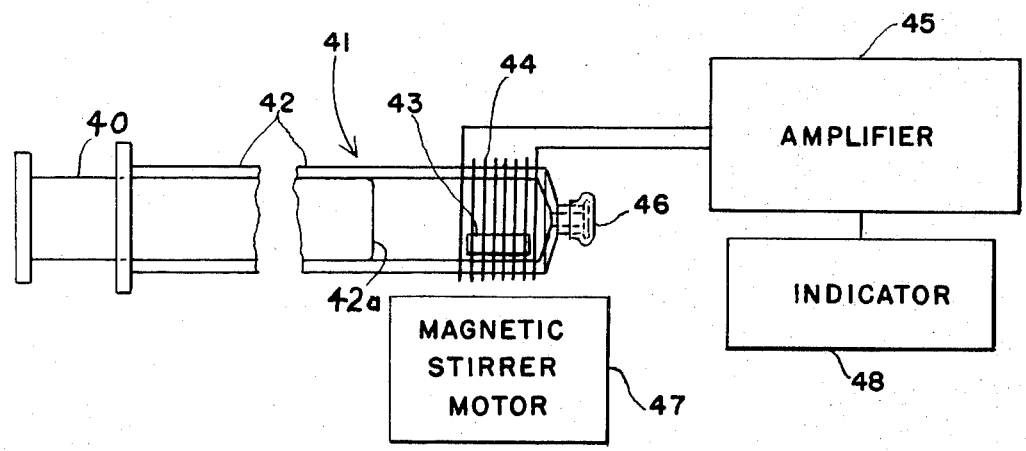
FIG. 4 shows schematically a syringe mixing chamber enclosing a magnetic stirrer with a coil therearound.

Accordingly, the mixing apparatus with an electromagnetic monitor system, as shown in FIG. 4, was devised. The reaction mixing chamber 41 consists of a 10 ml plastic syringe 42 containing a one-half inch plastic-coated magnetic stirring bar 43. The nozzle end of the syringe barrel 42 is wrapped with a 12 turn coil 44 of insulated electrical hookup wire within the magnetic field of the bar 43. The ends of this coil 44 are connected to an amplifier 45. The syringe nozzle access opening is plugged with a rubber injection port 46 after being filled with 1.2 ml of acrylamide, so that no air space remains and the solution is isolated from the atmosphere. Subsequently, all reagents are injected through this rubber port 46 with hypodermic needles so that no air is admitted to the chamber 41 at any time. As reagent is injected, a plunger 40 of the syringe 42, which forms a movable wall 42a of the chamber 41, is displaced to enlarge the capacity of the chamber to accommodate the reagent. When the hypodermic needle is withdrawn the resiliency of the rubber injection port 46 causes this small puncture therein to seal. The syringe 42 is clamped horizontally over a magnetic stirrer motor 47 which is switched on and adjusted to low speed (about 75 rpm). The amplifier 45 is connected to a monitor 48 that can be a chart recorder. It should be emphasized that the monitor can also be a digital clock responsive to the amplifier 45.

As the magnetic stirrer 47 causes the stirring bar 43 to turn, an electromotive force is generated in the coil 44 and recorded by the chart recorder. Measurement indicates this is about 1 mV peak amplitude. Persulfate, blood and bisulfite are injected through the injection port 46 in the usual sequence, with all volumes 3 times that for the manual method. When a gel forms, the magnetic stirring bar 43 is immobilized by the increased viscosity and the alternating voltage drops markedly to a low level produced by the magnetic field of the stirrer 47 thus indicating the end point of the reaction. The voltage drop occurs over about 2 seconds. The time interval from the addition of bisulfite can easily be read off the chart paper if the paper speed is known.

Figure 5:
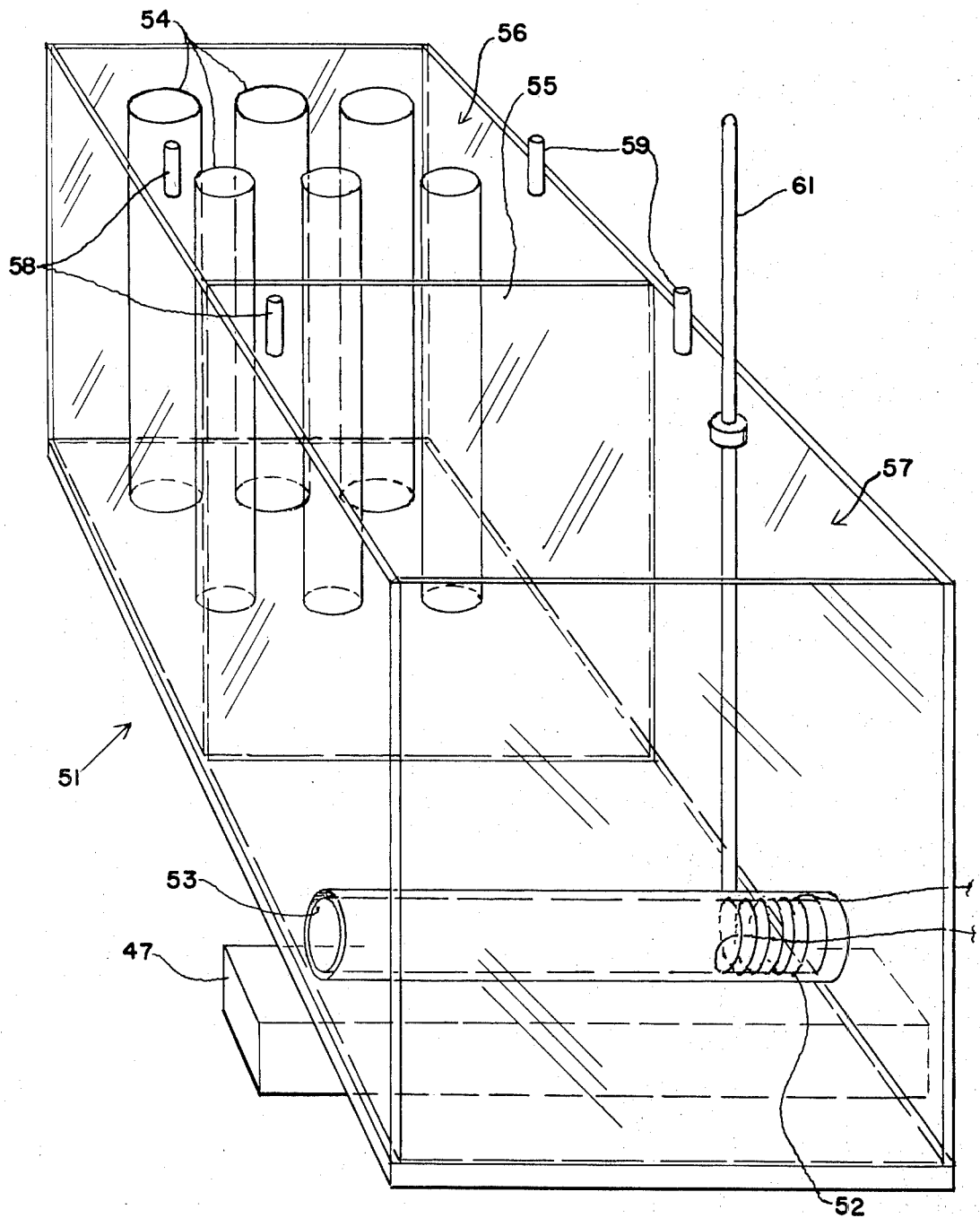
FIG. 5 is an isometric view of a water bath apparatus utilized in conjunction with the syringe shown in FIG. 4 to complete the preferred embodiment of the mixing apparatus.

To secure accurate temperature control, a jacketed water bath assembly 51 has been designed and is shown in FIG. 5. This assembly permits 10 ml syringes to be placed rapidly in position with respect to a permanently installed coil 52 in a lucite tube 53 over the stirrer motor 47. There are also jackets 54 to store persulfate, bisulfite and blood and assure they are at the appropriate temperature. A divider 55 separates the bath 51 into a storage chamber 56 and a reaction chamber 57. Separate inlets 58 and outlets 69 are provided for each chamber 56, 57. Separate chambers are supplied because the reaction is exothermic and thus the reaction chamber 57 requires a greater water flow to stabilize. A thermometer 61 indicates the temperature in the reaction chamber 57.

It should be noted that the syringe apparatus shown in FIG. 4 is useful in carrying on any reaction requiring atmospheric isolation and/or viscosity monitoring and the bath 51 shown in FIG. 5 is useful in those reactions if the temperature must be controlled.

Obviously, many modifications and variations of the present invention are possible in light of the above teachings. It is to be understood, therefore, that the invention can be practiced otherwise than as specifically described.

What is claimed is:

1. Mixing apparatus for mixing liquids comprising:
   mixing chamber means for containing liquids being mixed, said chamber means defining an access port and comprising atmospheric isolation means to prevent the interface of the liquids being mixed with a gaseous phase;
   mixing means to mix the liquids within said mixing chamber; and
   monitor means for monitoring the viscosity of the liquids within said mixing chamber.

2. Mixing apparatus according to claim 1 further comprising temperature regulator means.

3. Mixing apparatus according to claim 2 wherein said temperature regulator means comprises water bath means.

4. Mixing apparatus according to claim 3 wherein said mixing chamber means is separable from said water bath means.

5. Mixing apparatus according to claim 1 wherein said mixing chamber means is stationary.

6. Mixing apparatus according to claim 5 wherein said mixer means comprises a magnetic stirrer with a magnetized stirrer bar within said mixing chamber means.

7. Mixing apparatus according to claim 6 wherein said monitor means comprises electromagnetic means.

8. Mixing apparatus according to claim 7 wherein said electromagnetic means comprises a coil without said mixing chamber means but within the magnetic field produced by said magnetized stirrer bar so that electromotive force is induced in said coil in response to motion of said magnetized stirrer bar.

9. Mixing apparatus according to claim 8 wherein said monitor means comprises indicator means responsive to said electromotive force generated in said coil for indicating motion of said magnetic stirrer bar.

10. Mixing apparatus according to claim 9 wherein said indicator means comprises end point indicator means.

11. Mixing apparatus according to claim 1 wherein said mixing chamber means comprises expansion means for varying the volume of said mixing chamber means.

12. Mixing apparatus according to claim 11 wherein said mixing chamber means comprises walls, one of which is a movable wall and said expansion means comprises said movable wall.

13. Mixing apparatus according to claim 11 wherein said mixing chamber means comprises a syringe and said expansion means comprises the plunger of said syringe.

14. Mixing apparatus according to claim 1, wherein said atmospheric isolation means comprises sealant means.

15. Mixing apparatus according to claim 14 wherein said sealant means is a rubber injection port.

* * * * *